March 9, 1943.  J. GARRETT  2,313,532
MIRROR SUPPORT
Filed Dec. 30, 1940   3 Sheets-Sheet 2
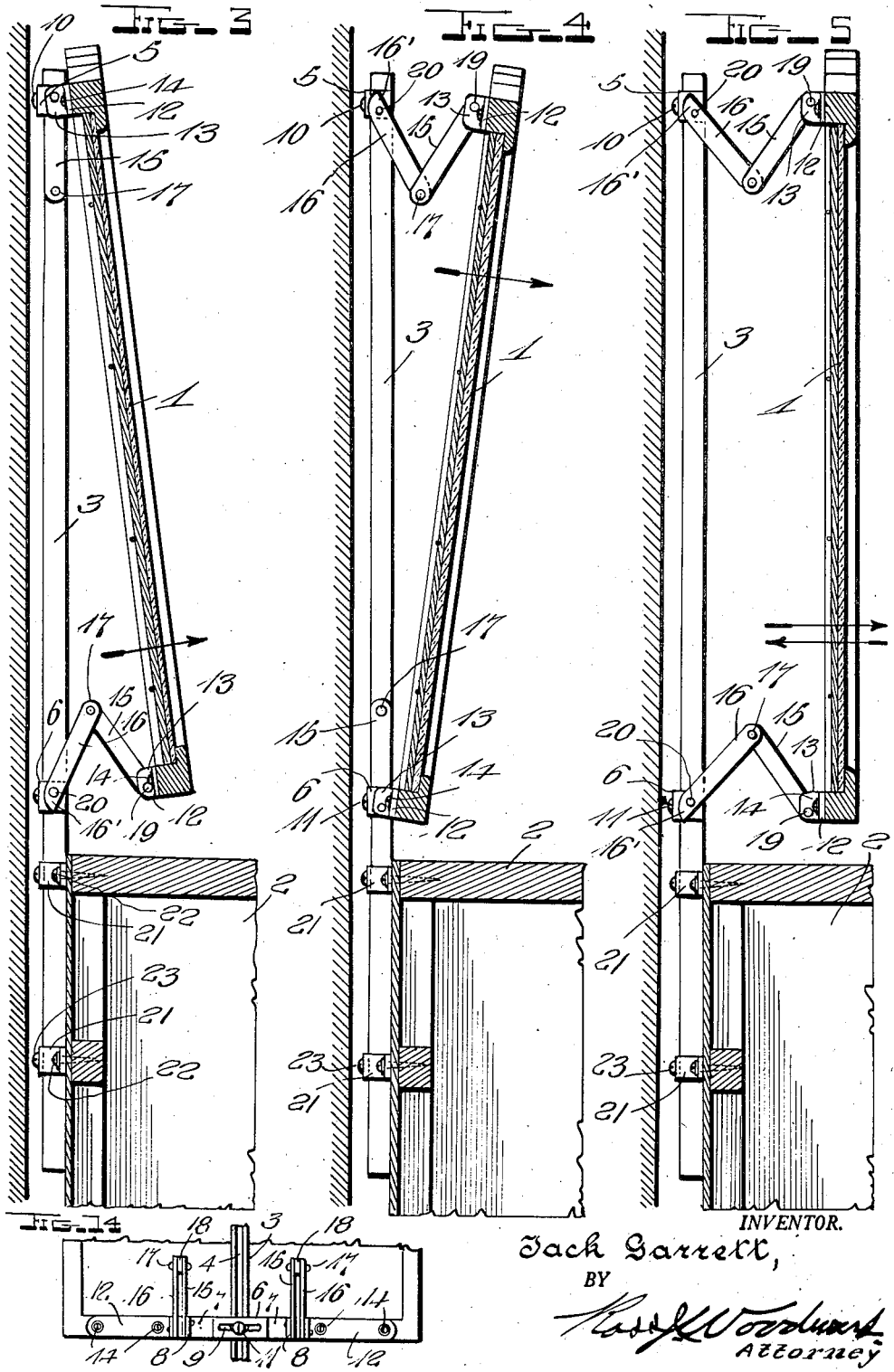
INVENTOR.
Jack Garrett,
BY
Attorney

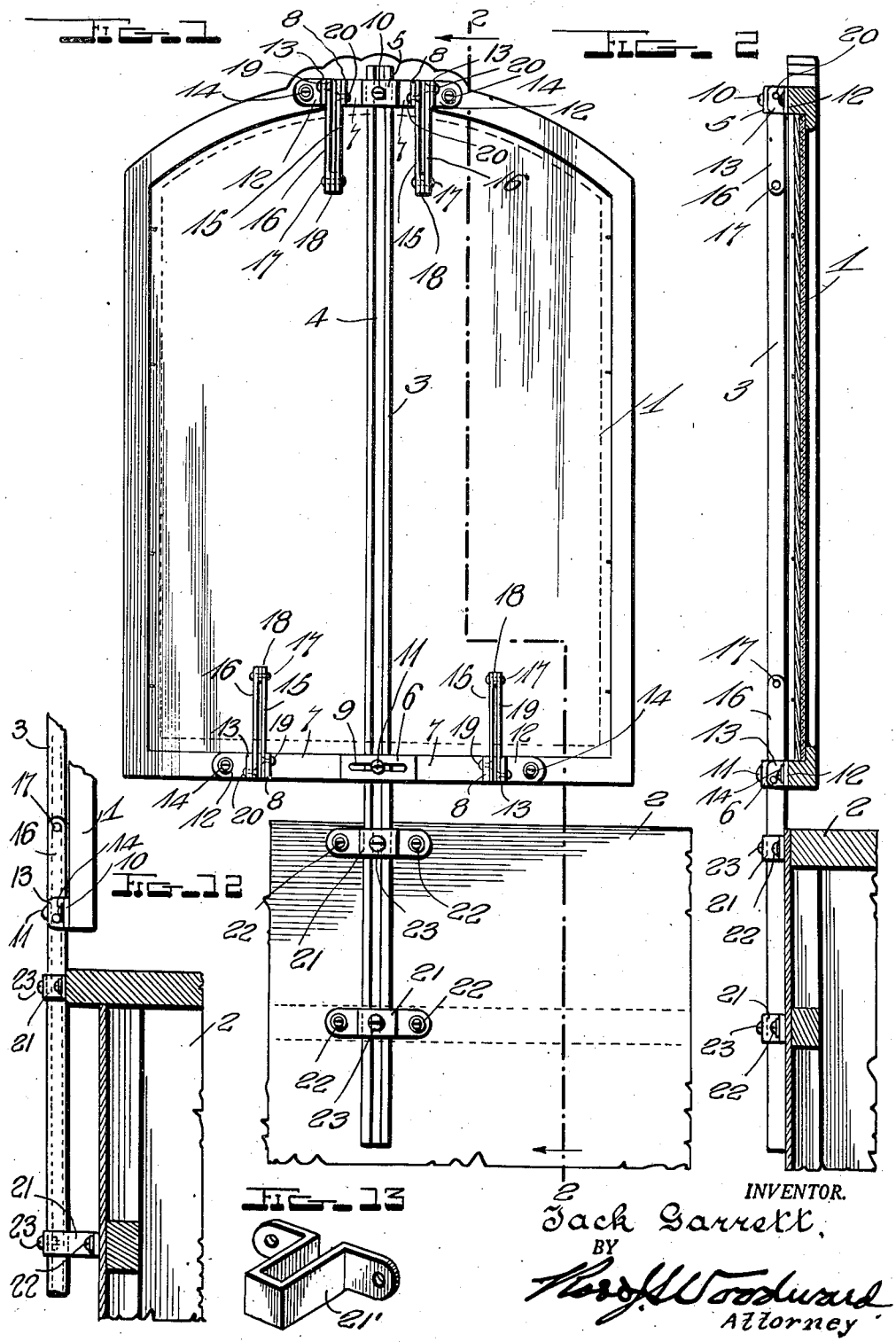

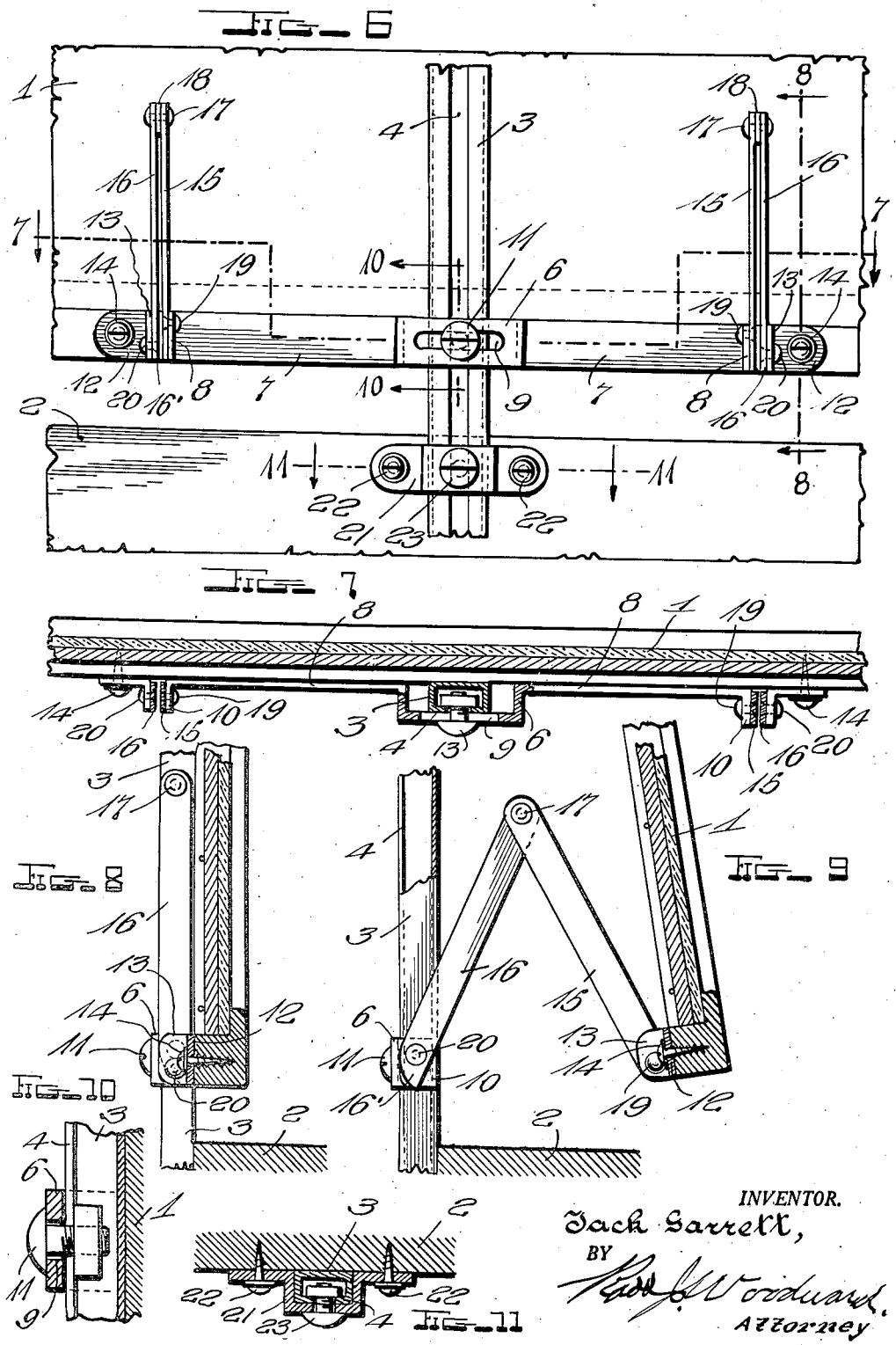

Patented Mar. 9, 1943

2,313,532

UNITED STATES PATENT OFFICE 2,313,532

MIRROR SUPPORT

Jack Garrett, Jamestown, N. Y.

Application December 30, 1940, Serial No. 372,402

4 Claims. (Cl. 88—99)

This invention relates to a mirror support and more particularly to a support for a mirror of the type used in connection with a dressing table or similar article of furniture.

One object of the invention is to provide a support so formed that a mirror for a dressing table may be vertically adjusted by a person sitting or standing in front of the dresser and thus accommodate the mirror to the height of the person using the same.

Another object of the invention is to not only permit the mirror to be shifted vertically and supported in adjusted position, but also allow the mirror to be tilted transversely and thus centered vertically with respect to the dressing table in case the supporting standard for the mirror is not mounted exactly perpendicular to the table when applied thereto.

Another object of the invention is to provide a mirror mounting device of such construction that the mirror may be tilted from either its upper end or its lower end and thus allow the mirror to have angular adjustment according to the wishes of the person using the mirror.

Another object of the invention is to so mount the mirror that it may not only be angularly adjusted but also shifted toward a person sitting or standing in front of the dressing table with which the mirror is associated and maintained in a vertical plane or then tilted for angular adjustment.

Another object of the invention is to so form and mount links constituting elements of the device that when the mirror is restored to its initial position after being tilted or shifted forwardly, the links will be prevented from swinging rearwardly beyond the stand. It will thus be seen that the links may not move to a rearwardly inclined position to possibly engage and mar a wall and will also be prevented from interfering when dressing tables equipped with the improved mirror supports are set in close back to back relation to each other for display in a store.

Another object of the invention is to provide a mirror support which may be easily applied to mirrors of various sizes and shapes.

The invention is illustrated in the accompanying drawings, wherein:

Fig. 1 is a rear view of a mirror mounted over a dressing table through the medium of a mirror mounting device of the improved construction.

Fig. 2 is a sectional view taken vertically on the line 2—2 of Fig. 1.

Fig. 3 is a view similar to Fig. 2, showing the mirror tilted forwardly from its lower end.

Fig. 4 is a view showing the mirror tilted forwardly from its upper end.

Fig. 5 is a view showing the mirror shifted forwardly but retained in perpendicular position.

Fig. 6 is a fragmentary view on an enlarged scale, showing the lower portion of the mirror and associated portions of the support.

Fig. 7 is a sectional view on the line 7—7 of Fig. 6.

Fig. 8 is a fragmentary vertical sectional view on the line 8—8 of Fig. 6.

Fig. 9 is a view similar to Fig. 8, showing the mirror tilted forwardly from its lower end.

Fig. 10 is a fragmentary sectional view on the line 10—10 of Fig. 6.

Fig. 11 is a sectional view taken on the line 11—11 of Fig. 6.

Fig. 12 is a view showing the mirror support applied to a dressing table having its top projecting rearwardly.

Fig. 13 is a perspective view of one of the brackets through which the standard of the mirror support passes.

Fig. 14 is a view in rear elevation showing a modified construction.

The mirror, which is indicated in general by the numeral 1, may be of any desired shape and dimensions, but has been shown of substantially rectangular outline. This mirror is to be mounted above a dressing table 2 or equivalent article of furniture, but instead of being hung from a nail driven into a wall or supported through the medium of a bed slat or other wooden bar, there has been provided a standard 3 formed of channeled metal and having a longitudinally extending slot 4 therein. This standard 3 may be of any length desired and passes through upper and lower brackets 5 and 6 which are formed of stiff metal and have side arms 7 terminating in rearwardly extending end portions or ears 8. The bridge portion of the lower bracket 5 is wider than the bridge portion of the upper bracket 5 so that a slot 9 may be formed therein. Therefore, when the bolts 10 and 11 are passed through the bridges of these brackets and threaded into engagement with their nuts, which are located within the standard, the bracket 6 may have shifting movement transversely of the standard and the bracket 5 have pivotal movement about the bolt 10. Companion to the brackets 5 and 6 are shoes 12 which are also formed of stiff metal and bent to form ears 13, and these shoes are secured to the frame of the mirror by screws 14.

Links 15 and 16 are pivoted to each other by rivets 17 and spaced from each other by washers 18, the links 15 being pivoted to the ears 8 by rivets 19 and the links 16 being pivoted to the ears 13 by rivets 20. By this arrangement, the mirror may be disposed vertically perpendicular to the top of the dressing table, as shown in Fig. 2, or it may be tilted from its lower end, as shown in Fig. 3, or tilted from its upper end, as shown in Fig. 4. Therefore, a person using the mirror may adjust it from either its upper end or its lower end and obtain a good view of his or her entire figure. It should also be noted that by grasping the mirror at approximately its center, it may be shifted forwardly and retain its perpendicular relation to the dresser top, as shown in Fig. 5. Good lighting effects may, therefore, be obtained and the mirror so adjusted that all portions of a person's body and clothing may be clearly viewed when dressing.

When the mirror is returned to its initial position shown in Fig. 2, it is desirable to have the links assume and remain in the perpendicular position shown in this figure, and it is also desired to have the links at one end of the mirror remain perpendicular when the other end of the mirror is tilted as shown in Figs. 3 and 4. Therefore, the rivets 19 and 20, which serve as pivot pins, are disposed out of alinement with each other, as shown in Figs. 1 and 6, and the pivoted ends of the links 16 are extended to form tapered ends or fingers 16' for engagement by portions of the mirror frame when the mirror is swung from a tilted position to perpendicular position or from the forwardly adjusted position of Fig. 5 to the initial position shown in Fig. 2. By this arrangement, the links will be prevented from moving to a position rearwardly of the standard and marring a wall or other surface against which the dressing table may be placed. This also allows a number of dressing tables to be placed back to back in a show room of a store without interference by the links.

The standard 3 is to be mounted vertically at the rear of the table and, in order to do so, there have been provided brackets 21 which are of U-shape formation and secured against the dresser by screws 22. Bolts 23 pass through the bridge portions of the brackets 21 with their securing nuts within the standard, as shown in Fig. 11, and when these bolts are tightened, the standard will be firmly held in vertically adjusted position. Therefore, the mirror may be disposed any desired height above the table top and firmly held in the adjusted position.

When the mirror is to be applied to a dressing table having marginal portions of its top extended, as shown in Fig. 12, an elongated lower bracket 21' will be used, the arms of this bracket being of such length that its outer end portion will be located directly under the upper bracket. In case the two brackets 21 should not be accurately applied to the dressing table in vertical alinement with each other, the standard would not be exactly perpendicular and the mirror would hang crooked. This may be corrected due to the fact that the bracket 6 is formed with an elongated slot in its bridge portion and by loosening the bolt 11 the mirror may be grasped at its lower end and tilted about the upper bolt to straighten it, the bolts being then tightened to firmly hold the mirror in set position.

In Fig. 14 of the drawings, there has been shown a slightly modified construction wherein the lower bracket 6 has short arms 7 instead of elongated arms and the shoes or brackets 12 are elongated and of such length that they will accommodate two screws 14 instead of one screw. By this arrangement, the shoes or attaching members will be firmly secured and prevented from tilting out of their proper positions.

In view of the fact that the bolts have their securing nuts disposed within the standard, the nuts will have engagement with side walls of the standard and loosening of the bolts will thus be prevented. Therefore, the standard will be prevented from slipping downwardly through the brackets 21 and the mirror will be prevented from slipping downwardly along the standard to a position in which it would rest upon the dresser and the upper portion of the standard project upwardly from the mirror. It will also be obvious that a mirror may be easily transferred from one dressing table to another and that a dressing table may be sold without or with a mirror.

Having thus described the invention, what is claimed is:

1. A mounting for a mirror comprising a standard having a longitudinally slotted rear wall, members for securing said standard at the back of a dresser, upper and lower brackets straddling the standard, bolts passing through the brackets and the slot of the standard to hold the brackets to the standard and permit adjustment of the brackets along the standard, and mirror-engaging members connected with said brackets, the lower bracket being formed with a transversely extending slot through which its securing bolt passes whereby a mirror having the mirror-engaging members secured thereto may be tilted about the bolt of the upper bracket and straightened.

2. A mounting of the character described comprising a standard, upper and lower brackets carried by said standard and shiftable along the same to vertically adjusted positions, said brackets having arms projecting from opposite sides of the standard and formed with rearwardly extending ears, other brackets companion to the first brackets adapted to be secured against the rear face of an article and having rearwardly extending ears at their inner ends for confronting ears of the first brackets, and pairs of vertically disposed links having inner ends pivoted to each other, the outer ends of the links being pivotally mounted between the ears of companion brackets for vertical swinging movement to mount the article for selective vertical tilting movement from its upper and lower ends and for bodily shifting movement toward and away from the standard.

3. A mounting of the character described comprising a standard, upper and lower brackets carried by said standard and shiftable along the same to vertically adjusted positions, said brackets having arms projecting from opposite sides of the standard and formed with rearwardly extending ears, other brackets companion to the first brackets adapted to be secured against the rear face of an article and having rearwardly extending ears at their inner ends for confronting ears of the first brackets, and pairs of vertically disposed links having inner ends pivoted to each other, the outer end of one link of each pair being pivoted to an ear of a bracket carried by the standard and the outer end of the other link of each pair being pivoted to a companion bracket carried by the article, the pivots connecting links with brackets of said article being offset vertically with respect to the pivots connecting links with the brackets carried by the standard when said article is disposed vertically in close contact with the standard.

4. A mounting of the character described comprising a standard, upper and lower brackets carried by said standard and shiftable along the same to vertically adjusted positions, said brackets having arms projecting from opposite sides of the standard and formed with rearwardly extending ears, other brackets companion to the first brackets adapted to be secured against the rear face of an article and having rearwardly extending ears at their inner ends for confronting ears of the first brackets, and pairs of vertically disposed links having inner ends pivoted to each other, the outer ends of the links being pivotally mounted between the ears of companion brackets for vertical swinging movement to mount the article for selective vertical tilting movement from its upper and lower ends and for bodily shifting movement toward and away from the standard, and the links pivoted to brackets carried by the standard having their ends extended to form tongues for engagement with the rear face of the article and maintain the links in a vertical position close to the rear face of the article when said article is shifted to a vertical position close against the standard.

JACK GARRETT.